Dec. 13, 1960 E. COUSINS 2,964,082
TRACTION AUGMENTING INSERT FOR TIRES
Filed June 18, 1958

INVENTOR.
EDWARD COUSINS
BY
*R. L. Miller*
ATTORNEY

United States Patent Office 2,964,082
Patented Dec. 13, 1960

2,964,082

TRACTION AUGMENTING INSERT FOR TIRES

Edward Cousins, Akron, Ohio, assignor to The Goodyear Tire & Rubber Company, Akron, Ohio, a corporation of Ohio Filed June 18, 1958, Ser. No. 742,914

9 Claims. (Cl. 152—211)

This invention relates to anti-skid or traction augmenting members or inserts adapted to be embedded in rubber traction members, and more particularly, but not exclusively, to such inserts adapted to be embedded in vehicle tires.

It has long been recognized that there is a definite need for traction members, particularly automobile tires, which are constructed to provide adequate traction on icy road surfaces or during other conditions where conventional tires fail to grip the road surface. Various types of tire constructions have been proposed some of which have elongated wire coils, wire mesh, or isolated individual traction elements incorporated into the rubber of the tread surface. Each of these traction elements or inserts have contributed to increased traction but each has disadvantages which makes the use thereof unfeasible. For example, wire coils require a certain "wearing in" period prior to the peak road gripping efficiency, and in addition, after the coil has been worn the remaining U-shaped members tend to work out of the tread so that the anti-skid feature of the insert is lost. Wire mesh is a satisfactory anti-skid insert but it is particularly difficult to disperse the mesh uniformly throughout the depth of the tread. Obviously, individually spaced or isolated inserts require a considerable amount of labor to be incorporated into the tread.

It is an object of this invention to provide an improved anti-skid tire construction having traction augmenting inserts therein which provide a large number of traction augmenting edges at the tread surface and which has substantially the same road gripping qualities during the entire useful life thereof.

Another object of this invention is to provide a non-skid tire construction in which the traction augmenting members or inserts may be economically embedded in a tire tread during manufacture of the tire or during recapping of a used tire.

A further object of the invention is to provide a non-skid tire construction in which traction augmenting inserts are made of thin sheet metal having a plurality of substantially parallel teeth terminating at the tread surface of the tire and projecting for the full depth of the tread of the tire and having a common edge extending longitudinally of the insert to which all of the teeth are integrally joined so that the insert when incorporated into the tread of the tire is sufficiently flexible to deform with the deformation of the tread during operation without decreasing its traction or efficiency.

Referring to the drawings.

Figure 1:
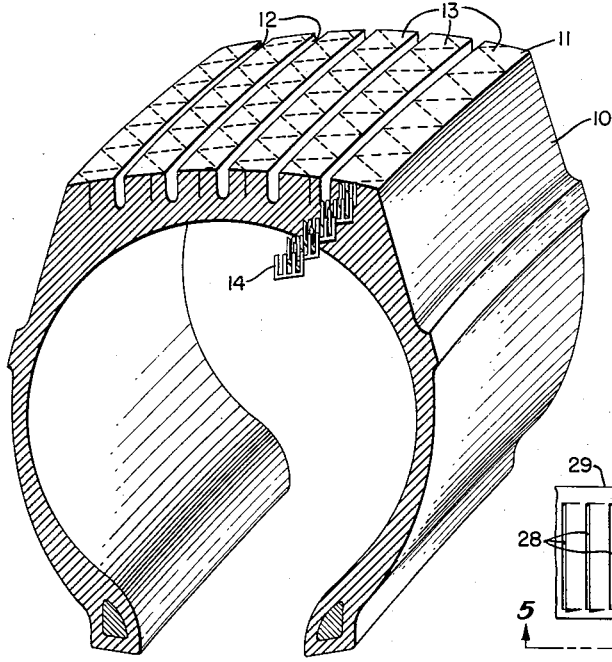
Fig. 1 is an isometric view of a tire with parts broken away and in cross section showing the preferred traction augmenting insert of the present invention embedded in the tread thereof.

Referring to the drawings the numeral 10 indicates a tire having a tread 11 which for the purpose of illustrating the invention is provided with a plurality of circumferentially extending grooves 12 forming intervening ribs 13. It is to be understood that the invention is applicable to a tire having any tread design as well as other articles having traction surfaces such as conveyor belts, shoes, mats and the like. A traction augmenting insert 14 is embedded in each of the ribs 13 and is substantially the same thickness or depth as the ribs 13 so that the insert will be fully effective to increase traction of the tire on ice and wet surfaces during the complete tread life of the tire.

Figure 2:
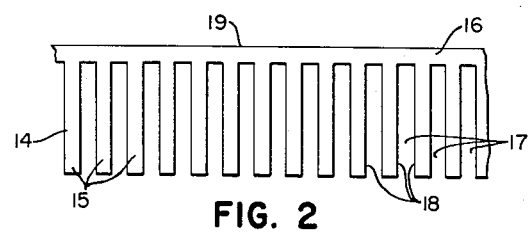
Fig. 2 is a fragmentary plan view of the preferred form of the traction insert of this invention.

Referring to Fig. 2, the insert 14 is made of sheet metal, preferably steel, and consists of a plurality of teeth 15 integrally joined to a base or edge member 16 which extend continuously longitudinally of the insert 14. The teeth 15 extend normal to the base 16 and in the same plane as the base 16. The intervening spaced slots 17 having substantially parallel edges 18 terminate short of the longitudinal edges 19 a distance substantially equal to the width of the teeth 15, so that the length of the teeth 15 is at least several times greater than the width of the base 16.

Figure 3:
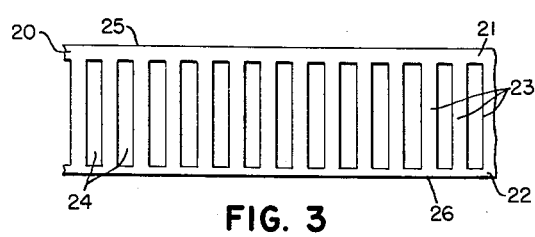
Fig. 3 is a fragmentary plan view of a modification of the traction insert shown in Fig. 2.

A modification of the traction augmenting insert of this invention is shown in Fig. 3. The insert 20 is formed of sheet metal and has a pair of continuous base or edge members 21 and 22 joined together by parallel bars or teeth 23 formed by the slots 24 which terminate short of the edges 21 and 22. The slots 24 terminate short of the longitudinal edges 25 and 26 a distance substantially equal to the width of the teeth 23.

Figure 4:
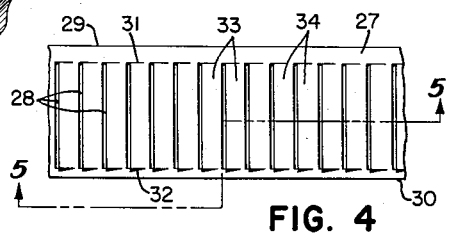
Fig. 4 is a plan view of another modification of the traction insert of this invention.
Figure 5:
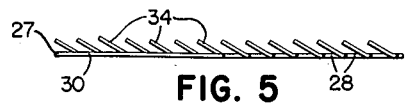
Fig. 5 is a cross sectional view taken along the lines 5—5 of Fig. 4.

In the modification of the traction augmenting insert of this invention as shown in Figs. 4 and 5, the insert 27 is made of thin sheet metal having transversely extending slots 28 which terminate short of the edges 29 and 30 and are provided with longitudinally extending portions 31 and 32 at each end of the slot 28 forming teeth or bars 33 which are bent out of the plane of the insert 27 at an acute angle, as shown in Fig. 5, to form winged portions of louvres 34.

Figure 6:
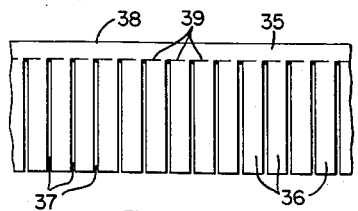
Fig. 6 is a modification of the traction insert shown in Fig. 4.

A modification of the traction augmenting insert shown in Figs. 4 and 5 is illustrated in Fig. 6. The insert 35 is provided with a plurality of louvres or winged portions 36 formed by transverse s'ots 37 extending through one edge of the insert 35 but terminating short of the edge 38. The winged portions or louvres 36 are formed by short longitudinally extending slots 39.

Figure 7:
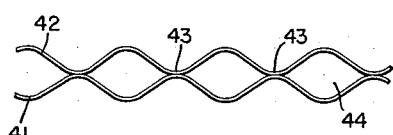
Fig. 7 is a fragmentary perspective view of a further modification of the traction insert of this invention.

The inserts shown in Figs. 2 through 6 of the drawings are preferably bent transversely at longitudinally spaced locations so that the continuous edge of the insert extends longitudinally in a sinuous or serpentine path as illustrated in Fig. 1 of the drawings to provide additional compressive strength during the tread molding operation and to provide additional traction longitudinally of the insert. The particular path is not critical so long as the insert extends both transversely and longitudinally of the rib 13 in which the insert is embedded. If preferred, a pair of inserts 41 and 42 of this invention may be bent transversely to extend in a sinuous path and then chemically or mechanically bonded together at spaced locations transversely of the length of the inserts as at 43 as shown in Fig. 7 of the drawings so as to form closed cells 44 having para'lel axes which extend normal to the tread surface of the tire.

The continuous edge 22 of the insert 20 shown in Fig.

3, and the continuous edge 30 of the insert 27 shown in Fig. 4 are disposed nearest the tread surface of the tire and the said edges are rapidly worn off so as to expose the teeth 24 and bars 34 respectively at the tread surface and increase the flexibility of the inserts in a direction normal to the tread surface.

It is, of course, essential to this invention that the traction augmenting insert be adhered to the tread rubber so that it will be retained therein during the life of the tire. In addition to the mechanical lock due to flow of rubber into the slots of the insert, the adhesion between the inserts and the tread rubber may be increased by coating the inserts with a suitable bonding agent, such as plasticized phenol formaldehyde, isocyanate resins, chlorinated rubber, or other well known adhesives for bonding metals to rubber.

The traction augmenting insert of this invention exhibits great compressive strength in directions transversely of the inserts even though the sheet metal is thin and the inserts very flexible. This invention provides inserts having the unique and desirable properties of high compressive strength and high flexibility as well as providing a continuous network of edges which extend in several directions and terminate in the same plane.

The inserts are embedded into the tread during the curing operation of new green tires or the curing or retreading operation of camelback on used tires. The inserts of a width and thickness described above, and a circumferential length approximately equal to the circumference of the tread, are placed within the tire curing matrix with the teeth normal to the tread-forming portion thereof. The insert has sufficient flexibility to be formed into an arc or circle having a radius of curvature less than the standard size of passenger and truck tires. Furthermore, as the curing mold is closed the inserts have sufficient compressive strength to maintain their position normal to the tread-forming portion of the matrix while the tread rubber of the green tire or camelback is being forced radially into the tread forming portion of the matrix and through the slots in the insert.

The tire 10 having inserts 14 of this invention embedded in the tread 11 exhibits very high resistance to skidding and good traction on icy and wet pavement. Since the inserts of this invention are quite flexible in planes both parallel and normal to the tread surface, the inserts are free to move or flex with the tread rubber during operation of the tire. The exposed ends of the teeth of the inserts are therefore not pounded against the surface of the pavement and therefore are not worn below the surface of the tread as is true of inserts of conventional constructions.

Although this invention has been described and illustrated by a tire having a plurality of circumferentially extending ribs, it is to be understood that the invention is not to be so limited and is applicable to a tire having a smooth tread surface with one or more inserts embedded therein, or to a tire having any conventional tread design including projections spaced circumferentially and/or transversely of the tread surface.

While certain representative embodiments and details have been shown for the purpose of illustrating the invention, it will be apparent to those skilled in this art that various changes and modifications may be made therein without departing from the spirit or scope of the invention.

I claim:

1. In a rubber traction member, a rubber tread portion integral therewith having at least one anti-skid insert made of thin flexible sheet metal embedded in the rubber of said tread portion in a plane normal to the tread surface, said insert extending longitudinally and transversely of said tread portion, said insert having a width of substantially the same dimension as the thickness of the tread portion, said insert having a longitudinally continuous base and a plurality of teeth projecting from the base toward the tread surface formed by closely spaced slots extending parallel to each other and transversely of said insert, said slots terminating short of said base, said teeth having a length several times greater than the width of said base.

2. In a rubber traction member as claimed in claim 1, an anti-skid insert in which said slots terminate short of both edges of said sheet.

3. In a rubber traction member as claimed in claim 1, an anti-skid insert in which said slots form intervening teeth which extend at an acute angle relative to the plane of said base.

4. In a rubber traction member, a rubber tread portion integral therewith having at least one anti-skid insert made of thin flexible sheet metal embedded in the rubber of said tread portion in a plane normal to the tread surface, said insert extending longitudinally and transversely of said tread portion, said insert having a base portion extending continuously longitudinally of the insert and a plurality of spaced teeth integrally formed with said base and extending transversely thereof to the tread surface, said teeth having a length several times greater than the width of said base.

5. In a rubber traction member as claimed in claim 4, an anti-skid insert in which said teeth are positioned in the same plane as the base.

6. In a rubber traction member as claimed in claim 4, an anti-skid insert in which at least a portion of said teeth extend at an acute angle to the plane of said base.

7. In a rubber traction member as claimed in claim 4, an anti-skid insert in which a pair of anti-skid inserts are secured together transversely at spaced location longitudinally of the inserts to form intervening cells the axes of which are normal to said tread surface.

8. In a vehicle tire tread having spaced grooves forming intervening ribs, metal traction augmenting insert embedded in said ribs, said insert having a plurality of closely spaced teeth extending normal to and terminating at the tread surface, said teeth being integrally joined together at the base of said ribs and having a length substantially equal to the depth of said ribs, said insert being flexible in planes both parallel and normal to the tread surface, whereby the inserts flex with the tread rubber during operation of the tire.

9. A vehicle tire as claimed in claim 8 in which said insert extends longitudinally and transversely of said ribs.

References Cited in the file of this patent

UNITED STATES PATENTS

| | | |
|---|---|---|
| 1,399,556 | Hill | Dec. 6, 1921 |
| 2,121,740 | Kraft | June 21, 1938 |
| 2,234,823 | Hewel | Mar. 11, 1941 |

FOREIGN PATENTS

| | | |
|---|---|---|
| 545,632 | Great Britain | June 5, 1942 |
| 1,009,953 | Germany | June 6, 1957 |
| (Corresponding Great Britain Patent 791,724, Mar. 12, 1958) | | |
| 1,027,089 | Germany | Mar. 27, 1958 |
| 549,042 | Canada | Nov. 19, 1957 |